UNITED STATES PATENT OFFICE.

FERDINAND-CHRISTOPH VON HEYDEBRAND UND DER LASA, OF NEW YORK, N. Y.

ARTIFICIAL FUEL.

SPECIFICATION forming part of Letters Patent No. 660,753, dated October 30, 1900.

Application filed November 27, 1899. Serial No. 738,443. (No specimens.)

*To all whom it may concern:*

Be it known that I, FERDINAND-CHRISTOPH VON HEYDEBRAND UND DER LASA, a citizen of the United States, and a resident of New York city, in the county of New York and State of New York, have invented certain new and useful Improvements in Artificial Fuel, of which the following is a specification.

The object of this invention is to produce a fuel in which no carbon or hydrocarbon forms any of its primary parts and which may be reburned several times without remixing.

The invention consists in compounding earth or loam, sulfuric acid diluted with water, sulfur, and lime or products of lime, such as chlorid of lime or carbonate of lime, sulfate of iron, iron pyrites, sulfate of magnesium, and sulfate of soda, which are thoroughly pulverized and mixed, caking of the compound into any suitable-sized pieces to correspond with the several grades of ordinary coal, and to reburn the mixture without recompounding or adding any of the primary or other ingredients.

I am well aware that artificial fuel has been manufactured and that many patents have been granted; but in all of them carbon or hydrocarbon in some form has been the main or principal element forming the compound. These carbons or hydrocarbons are usually pulverized coal, tar, pitch, rosin, or oils, which create a black smoke, making a fuel or substitute of little or no commercial value and far beyond the cost of soft or anthracite coal.

The relative proportions of my composition can be varied more or less. I therefore would not limit the amount of the several chemicals which I employ or compound with the earth.

The sulfuric acid I employ (which I dilute with a large per cent. of water) is used in very small quantities and with the loam forms the principal ingredients, as I can produce a good fuel with them alone; but such a compound does not burn with such brilliancy or heat as when I employ a very small amount of some or all of the following chemicals: sulfur, sulfate of magnesium, iron pyrites, sulfate of soda, and sulfate of iron, with lime or products of lime, such as chlorid of lime or carbonate of lime, which is employed as a binder. These several ingredients (in about the following proportions: earth, seventeen hundred pounds per ton; sulfur or sulfur-containing substances, fifty-five pounds per ton; sulfate of magnesium, twenty-eight pounds per ton; sulfate of soda, fourteen pounds per ton; lime or products of lime, one hundred and seventy-five pounds per ton, and sulfate of iron or iron pyrites, twenty-eight pounds per ton) are placed in one common receptacle and thoroughly mixed by any ordinary agitator or mixing apparatus. The compound is then pressed into suitable pieces best adapted for commercial use. It is then dried by natural action of the air or by artificial heat.

In manufacturing this fuel an ordinary brick-machine may be employed. It can be made from any kind of soil, which fact will enable it to be made out in the open air and under all conditions.

This fuel is ignited the same as any ordinary coal by aid of wood or any combustible.

By careful experiments I have found that this fuel is free from smoke, sparks, clinkers, and cinders, clean to handle, does not lose any of its heat qualities by age or exposure to weather, that no spontaneous combustion can occur, and that there are no obnoxious gases before or while burning. Careful tests have shown that it burns steadily longer and develops more units of heat than the best red-ash coal and at less cost.

After this fuel has been burned once it recuperates and can be reburned over and over six or seven or more times without adding any new material or even remixing. The second and third burning are more intense than the first.

The recuperating qualities of the compounds composing my fuel can be readily seen to be of great commercial value in all industries, and particularly so to the several governments, as it will save recoaling war-ships so often, and in case of actual necessity it can be manufactured on board when too far from a coaling-station by obtaining soil from any land or port.

While I have named certain chemicals as necessary to produce the fuel, I can also employ many equivalents, such as nitric or muriatic acids. I may dispense with sulfuric acid and substitute sulfur or iron pyrites.

Instead of diluting the sulfuric acid with water I may use a weak solution of sulfuric acid.

Having thus fully described my invention or discovery, what I claim, and desire to secure by Letters Patent of the United States, is—

1. A composition of matter for artificial fuel consisting of earth and a sulfur-containing substance in the proportions substantially as described.

2. A composition of matter for artificial fuel consisting of earth and sulfur, in the proportions substantially as described.

Signed at New York city, in the county of New York and State of New York, this 14th day of October, A. D. 1899.

FERDINAND-CHRISTOPH VON
      HEYDEBRAND UND DER LASA.

Witnesses:
  H. LE MON,
  E. T. THOMAS.